G. C. LOENING.
AEROPLANE TRUCK.
APPLICATION FILED NOV. 13, 1916.

1,357,177.

Patented Oct. 26, 1920.
2 SHEETS—SHEET 1.

INVENTOR
Grover C. Loening
BY
Robt. P. Haines,
ATTORNEY

UNITED STATES PATENT OFFICE.

GROVER CLEVELAND LOENING, OF BOSTON, MASSACHUSETTS, ASSIGNOR TO STURTE-VANT AEROPLANE COMPANY, OF JAMAICA PLAIN, MASSACHUSETTS, A CORPORATION OF MASSACHUSETTS.

AEROPLANE-TRUCK.

1,357,177.    Specification of Letters Patent.    Patented Oct. 26, 1920.

Application filed November 13, 1916. Serial No. 130,981.

*To all whom it may concern:*

Be it known that I, GROVER CLEVELAND LOENING, a citizen of the United States, residing at Boston, county of Suffolk, and State of Massachusetts, have invented an Improvement in Aeroplane-Trucks, of which the following description, in connection with the accompanying drawings, is a specification, like characters on the drawings representing like parts.

The invention to be hereinafter described relates to aeroplanes, and more particularly to an improved truck for aeroplanes of the sea-plane type.

Heretofore, in launching and landing the sea-plane, it has been the practice to introduce a pair of trucks beneath the pontoons of the aeroplane and support the latter therethrough. There are serious objections, however, to this practice. It is difficult to manipulate, adjust and secure the trucks in proper registration with the pontoons, and the seating of the pontoons upon the trucks is likely to scrape and mutilate the same, and set up injurious stresses therein.

One of the objects of the present invention is to provide a truck which can be quickly and readily detachably connected with the aeroplane, independently of the pontoons. Another object is to provide a truck which may be directly connected with the fuselage of the aeroplane and support the latter therethrough. Still another object is to support the aeroplane by a simple, strong, single truck, instead of the pair of trucks, as heretofore.

The character of the invention may be best understood by reference to the following description of an embodiment thereof, shown in the accompanying drawings, wherein:—

Figure 1:
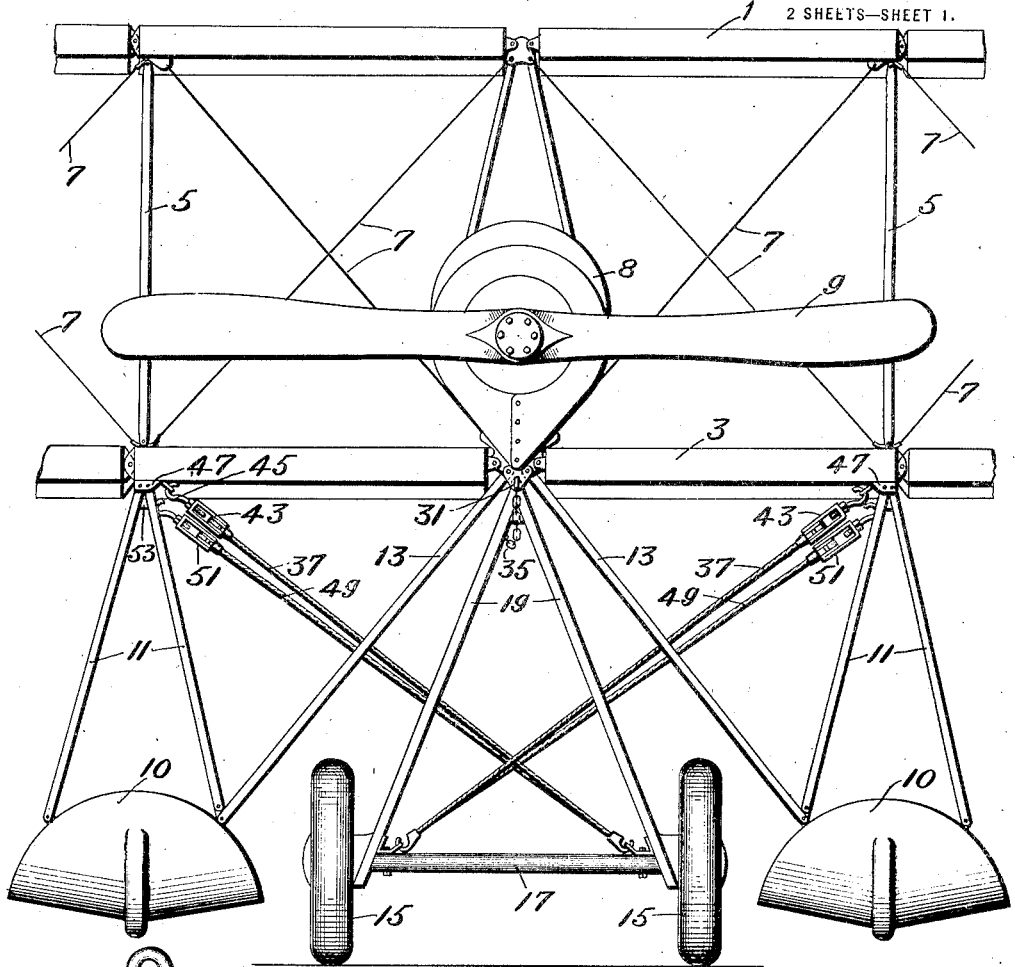
Figure 1 is a front elevation of a portion of a sea-plane equipped with a truck embodying the invention.
Figure 2:
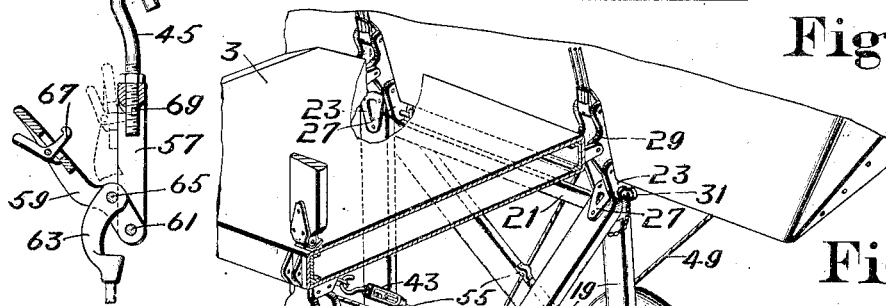
Fig. 2 is a perspective view of the truck and portions of the aeroplane connected thereto.
Figures 3, 4:
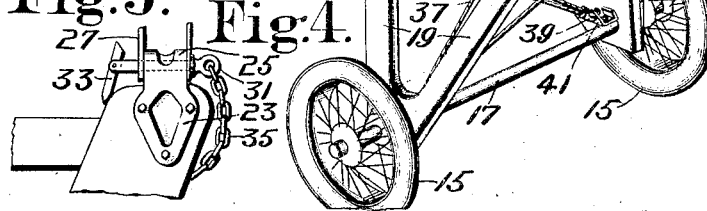
Fig. 3 is a detail view of a turn-buckle for tensioning the truck-securing guys.
Figure 5:
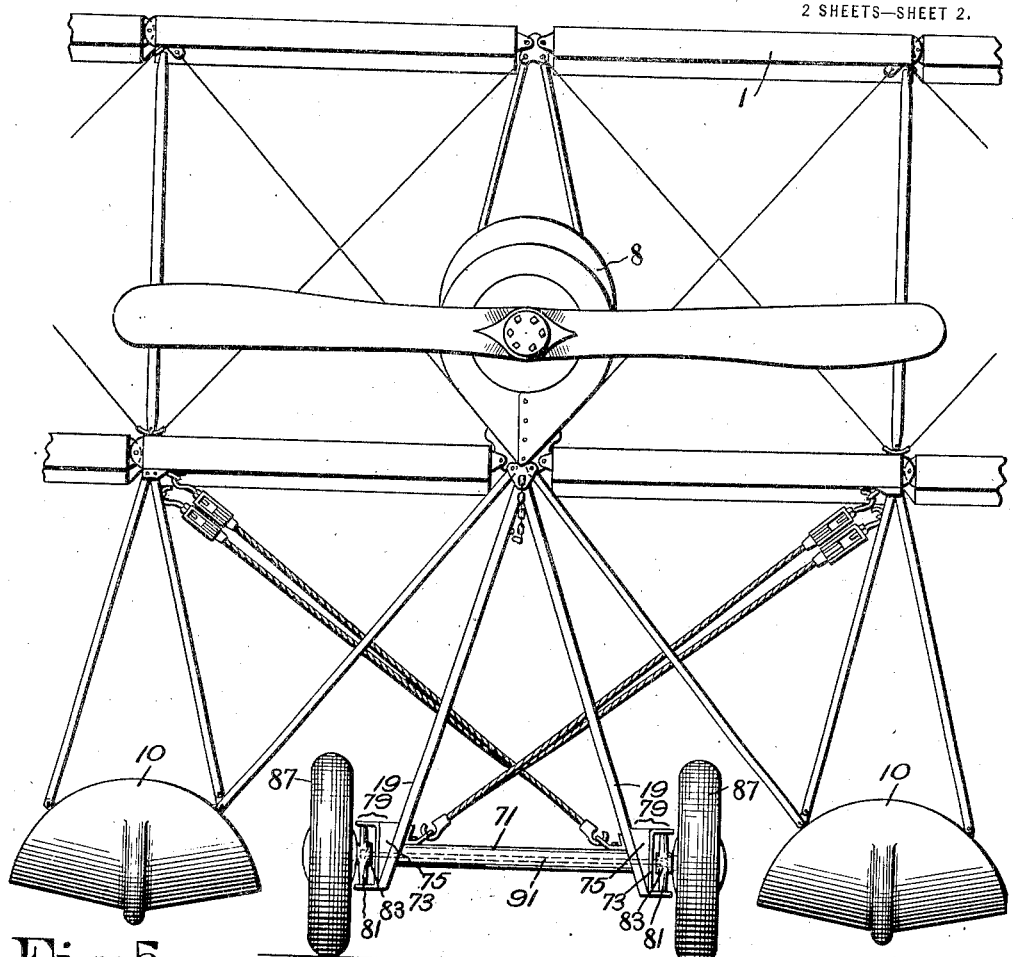
Figure 6:
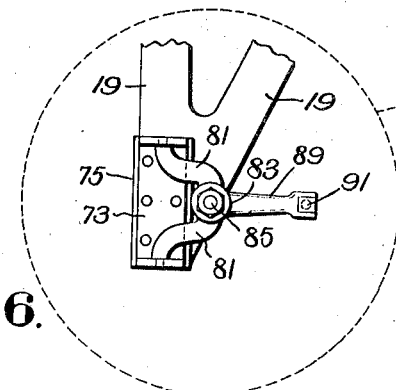
Figure 7:
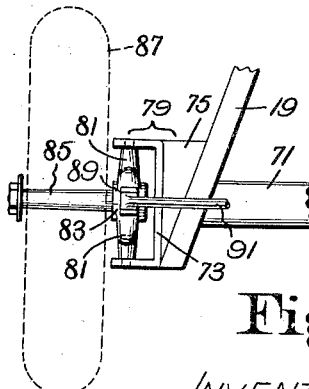

Fig. 4 on an enlarged scale, shows a device for pivotally connecting the truck with the fuselage;

Fig. 5 is a front elevation of a sea-plane equipped with a modified form of truck provided with caster-wheels;

Fig. 6 is a side elevation, on an enlarged scale, showing the means for connecting one of the wheels with the truck; and Fig. 7 is an end elevation of the parts shown in Fig. 6.

Referring to the drawings: 1 and 3 designate the main sustaining planes of the aeroplane, which are connected by struts 5 and diagonal guy wires 7. A body 8 mounted above the lower main sustaining plane is adapted to receive the engine for driving the propeller 9 and has space therein to accommodate the pilot and passengers. The pontoons 10 are arranged beneath the main planes and are connected to the lower plane by struts 11 stiffened by diagonal stays 13.

Having described the general construction of the sea-plane, next will be described the truck shown herein as embodying the invention.

This truck comprises wheels 15 preferably fitted with pneumatic tires and journaled on a shaft 17. A pair of triangular frames converge upwardly from said shaft toward the base of the body of the fuselage of the aeroplane, each of said frames comprising members 19 diverging upward from said shaft, the upper ends of said pair of frames being connected by a fore-and-aft top bar or member 21. The construction is such that the pair of frames and the members thereof are maintained in rigid relation and desirably distribute the support from the wheel shaft to points spaced fore-and-aft of the body or fuselage.

The truck preferably is detachably connected directly with the fuselage of the aeroplane. To accomplish this, the frames may have straps 23 secured thereto, formed to present eyes 25 adapted to be connected with clevises 27 secured to a portion 29 of the fuselage by pins 31 having lock bars 33 pivoted thereto. These pins may be connected to the frame by chains 35.

The truck frames converge from the wheels upward toward the fore and aft axial line of the aeroplane, and are directly connected to the base of the fuselage. Thus, so far as the support offered by the truck is concerned, the aeroplane as a whole would be free to tilt about the pins 31 as fulcra. To prevent this tilting movement, suitable means may be provided, shown herein in the form of guys 37 having hooks 39 at their lower ends for connection with brackets 41 secured to the wheel shaft 17, referred to. The upper ends of the guys may be connected to turn-buckles 43 having hooks 45 connected with eyes in brackets 47 secured to the lower main sustaining plane adjacent the advance edge thereof.

Each of the guys 37 may have a companion guy 49 connected to the hook at its lower end, and provided with a turn-buckle 51 having a hook thereon adapted to be connected to the eye of a bracket 53 secured to the lower main sustaining plane adjacent the rear edge thereof. The guys may pass through eyes in blocks 55 on the truck frame to contribute to the positioning thereof.

Preferably, a suitable form of turn-buckle is employed, which may be operated to quickly and readily tension the said guys. This turn-buckle, Fig. 3, comprises a U-shaped member 57 having the hook 45 threaded in one end thereof to vary the effective length of the guy. A lever 59 may be pivoted on a pin 61 at the opposite end of said member, and may have an arm 63 pivotally connected thereto by a pin 65 offset a short distance from the pin 61. The arm 63 is anchored to the guy wire. A spring-pressed latch 67 on the lever coöperates with a shoulder 69 on said member to hold the lever in active tensioning position.

After the hooks at the ends of a guy have been connected with the wheel and the main plane brackets, the lever 59 is rocked from its full line position to its dotted line position, shown in Fig. 3. In the course of this movement, the pivot pin 65 will move upward to a dead center position above the pin 61, and thereby impart tension to the guy. The lever is held in position by the automatic locking of the latch 67 with the shoulder 69. To detach the guy, it is merely necessary to rock the latch away from its shoulder and shift the lever 59 toward the left of Fig. 3 from its dead center position. This will give the guy sufficient slack to permit the same to be readily released from its brackets. To understand the use of the truck, it may be supposed that the sea-plane has alighted upon the water, and is to be conveyed into its hangar. To accomplish this, the truck is introduced beneath the aeroplane beneath its pontoons, and the upper end of the truck frame is quickly and readily connected to the fuselage by the pins 31. Then the upper ends of the guy wires are connected to the brackets at the fore and aft edges of the lower main sustaining plane, and quickly tensioned by the said turn-buckles, as described.

The truck is now tightly secured to the aeroplane and the latter may be readily rolled from the water up the beach to its hangar.

In launching the aeroplane, it is rolled into the water on the truck, and the latter may be easily and readily disconnected therefrom, merely by releasing the guy wires from the aeroplane and removing the pins 31.

Referring to Fig. 5: the sea-plane shown therein is similar to the one already described, but the truck is somewhat different. Instead of mounting the wheels on a single long shaft, they are mounted to permit them to swivel on vertical axes in a manner analogous to casters. To accomplish this the side members 19 of the truck frame may be connected at their lower ends by a horizontal bar 71 and bearing brackets 73 are secured to wedge-shaped blocks 75 fast on the outer faces of said side members. Wheel carriers 79 have arms 81 with reduced ends pivoted in vertically opposed bearings in said brackets, and hubs 83 in which stud axles 85 are secured receive the wheels 87. Said arms may be curved from their vertical bearings toward said axles so that the latter will be offset rearward from said bearings as will be noted in Fig. 7. To cause the wheels to swing in unison, the arms 89 may be provided extending rearward from said stud shaft hubs and connected by a rod 91.

Since the horizontal axes of the wheels are located rearward from the vertical axes about which they swing, the wheels will automatically swivel to direct themselves to readily follow the direction in which the aeroplane is propelled, whether laterally or forwardly, and thereby facilitate the movement of the aeroplane over the ground from place to place.

While the truck has been described more particularly with reference to its use for sea-planes, it will be understood that it may also be used for supporting aeroplanes while propelled over land under power.

It will be understood that various deviations may be made from the specific embodiment of the invention shown herein, without departing from the spirit and scope of the claims.

What is claimed is:—

1. The combination with an aeroplane, of a supporting truck therefor comprising a shaft, wheels therefor, a pair of frames converging upward from said shaft toward each other, each of said frames comprising members diverging upward from said shaft, an upper member connected to the upper ends of said converging frames, and devices adjacent the fore-and-aft ends of said upper member for detachably connecting the truck with the fuselage of the aeroplane.

2. A supporting truck for an aeroplane, comprising a pair of upwardly converging frames, each of said frames comprising upwardly diverging members, means for maintaining the lower ends of the upwardly converging frames in separate relation, a fore-and-aft member rigidly connected to the upwardly diverging members of each of the upwardly converging frames, and a pair of wheels mounted at the lower ends of said frames.

3. A supporting truck for aeroplanes, comprising, in combination, a shaft, supporting wheels mounted on the shaft, a pair of frames mounted upon the shaft inside the supporting wheels and converging upwardly toward each other, each of said frames formed of supporting side members diverging upwardly from their connection with the shaft, a rigid bar extending between the side members of each frame at their upper ends and uniting the converging frames, and devices adjacent the ends of the rigid bar for connecting the truck with the fuselage of the aeroplane.

4. A supporting truck for an aeroplane, comprising a pair of upwardly converging frames, each of said frames comprising upwardly diverging members united at their lower ends, a fore-and-aft rigid member connected to the upper ends of said frames, wheels mounted at the lower ends of said frames, and means for detachably connecting the upper end of the truck to the fuselage of the aeroplane.

5. In an aeroplane, the combination of a shaft, a pair of wheels mounted on said shaft, a pair of upwardly converging frames mounted on the shaft and each formed of upwardly diverging side members, a rigid bar extending between and secured to the upper ends of the diverging side members of the two converging frames, means for supporting the fuselage from the diverging side members of the converging frames, and cross guys secured to the converging ends of the side frames adjacent the supporting shaft.

In testimony whereof, I have signed my name to this specification.

GROVER CLEVELAND LOENING.